Jan. 29, 1963   W. F. FUNKE ET AL   3,075,755
CUTTING ROLLER FOR CUTTING ROCK, ORE, AND THE LIKE
Filed Dec. 7, 1959   4 Sheets-Sheet 1

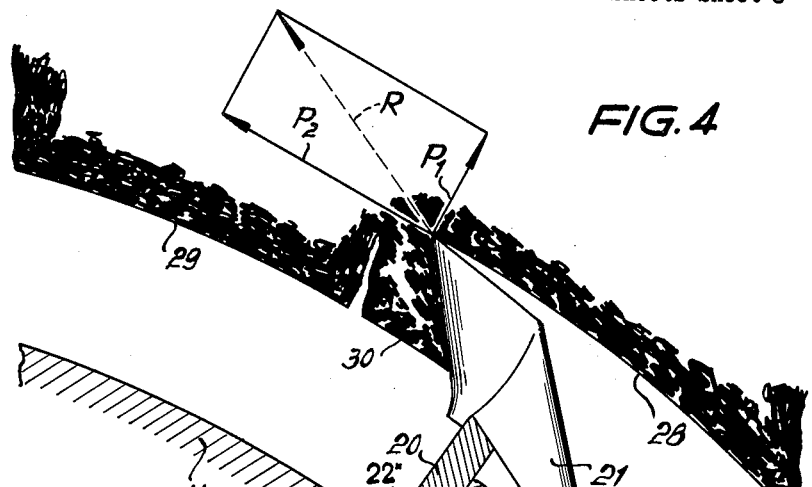
FIG. 4
FIG. 5
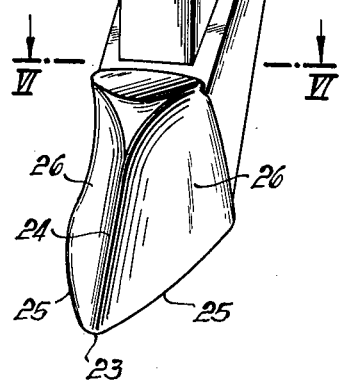
FIG. 6
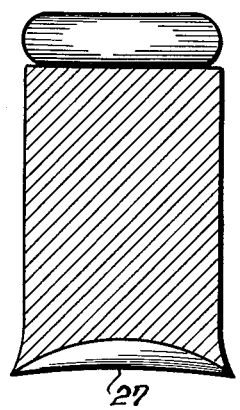

FIG. 7
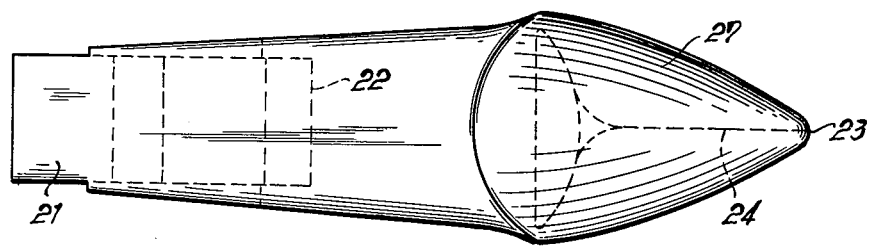
FIG. 9 FIG. 8 FIG. 10
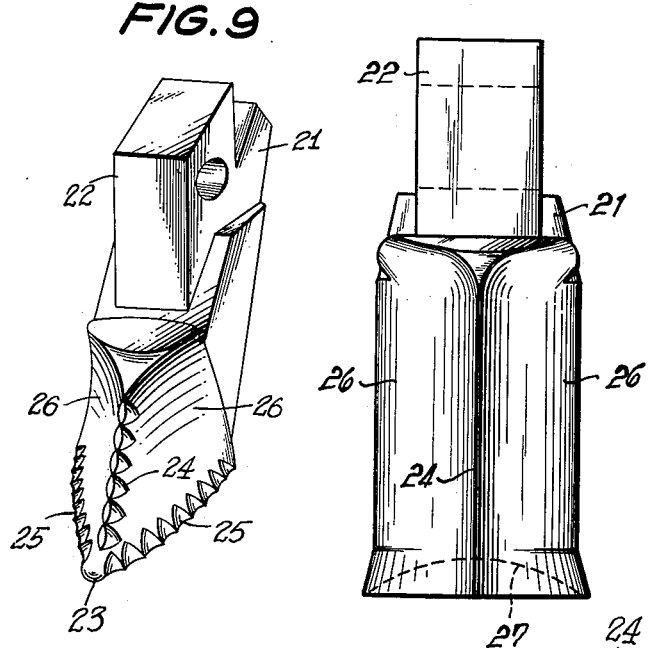
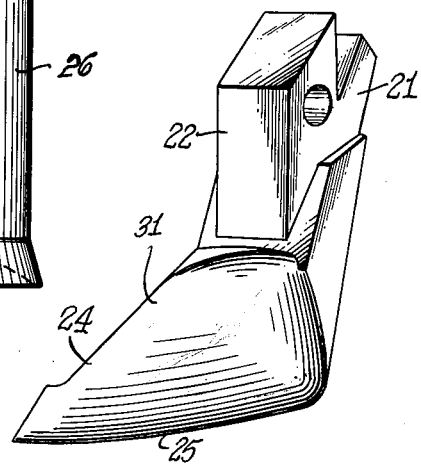

United States Patent Office 3,075,755
Patented Jan. 29, 1963

3,075,755
CUTTING ROLLER FOR CUTTING ROCK, ORE, AND THE LIKE
Wilhelm F. Funke, Bochum, and Heinrich August Otto Hugo Honke, Bochum-Stiepel, Germany, assignors to Gebr. Eickhoff Maschinenfabrik & Eisengresserei m.b.H., Bochum, Germany
Filed Dec. 7, 1959, Ser. No. 857,810
Claims priority, application Germany Dec. 17, 1958
7 Claims. (Cl. 262—27)

The present invention relates to a cutting roller and, more specifically, a cutting roller for cutting rock, ore, or the like.

A cutting roller of the above mentioned type generally consists of a slowly rotatable drum which has mounted on the outside thereof and in a plurality of planes perpendicular to the drum axis a plurality of cutting chisels or bits.

Due to the rotary movement of the drum, the said chisels or bits enter into the rock or ore to be loosened and thus, while the roller or drum gradually progresses parallel to the wall of the solid rock, the said chisels will free a space having a height substantially equalling the diameter of the drum and having a width substantially equalling the length of the drum.

The heretofore known cutting rollers usually have a plurality of cutting devices, such as chisels, arranged in each cutting plane, i.e. cutting line, over the circumference of the drum. The chisels employed with these known cutting rollers were usually held by holders arranged perpendicular to the working direction while said chisels are provided with a hard metal cutting edge. In order properly and sufficiently to fasten the hard metal edge or plate to the chisel, it was necessary to make the cutting or wedge angle of the chisel relatively large. This, however, results in a small rake angle so that considerable power was required to overcome the forces occurring at the cutting edges of the chisels. Each of the relatively great number of chisels mounted along the same cutting line entered only to a very small degree into the respective rock or ore so that the rock or ore was loosened in relatively small pieces only. This, however, is undesirable when cutting coal.

It is, therefore, an object of the present invention to design a cutting roller and the cutting chisels therefor that the loosened rock or ore or the like will be obtained in a coarser form.

It is another object of the present invention to design and arrange the cutting chisels on the cutting drum that the required power for driving the drum will be considerably reduced and while the number of chisels along each cutting line might be reduced, if desired even to one, the cutting depth will be considerably increased.

It is a further object of this invention to design the chisels of the cutting roller that the wear of the chisels will be considerably reduced and the life thereof will be considerably increased.

These and other objects and advantages of the invention will appear more clearly from the following specification in connection with the accompanying drawings, in which:

FIG. 1 diagrammatically illustrates a top view of a cutting roller while cutting into solid coal, FIG. 1 also showing the driving means for the cutting roller.

FIG. 4 illustrates on a scale larger than that of FIG. 2 and partly in section a cut-out from the surface of the cutting roller with a cutting chisel.

FIG. 5 is a perspective illustration of an individual chisel seen from the front at an angle.

FIG. 6 is a vertical section along the line VI—VI of FIG. 5 but on a scale somewhat larger than that of FIG. 5.

FIG. 7 illustrates likewise on a larger scale than FIG. 5 a view of an individual chisel seen from the cut surface.

FIG. 8 is a top view of a cutting chisel.

FIG. 9 illustrates somewhat similar to FIG. 5 a perspective view of a modified chisel.

FIG. 10 represents a perspective view of still another modified chisel as it may be used in connection with a cutting roller along the cutting line located closest to the coal front when looking in axial direction of the cutting roller.

Figure 1:
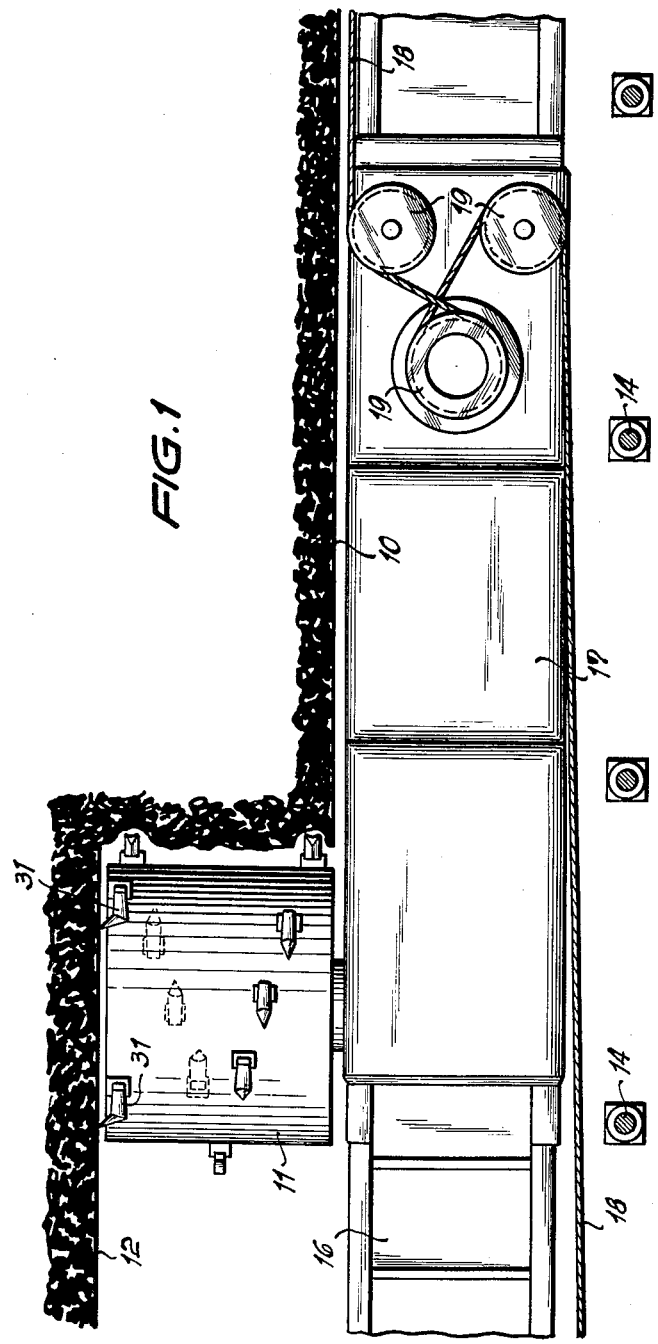

The present invention is characterized primarily in that the head of the cutting chisels mounted on the cutting drum has at least approximately the shape of a tetrahedron. One corner of the tetrahedron forms the chisel tip and the three sides meeting at said corner form the cutting edges. One of these edges, namely the one which is located in the plane of symmetry of the chisel perpendicular to the axis of the drum, forms the front edge of the chisel head. The two chisel sides, which are arranged symmetrically with regard to said plane of symmetry, form the side edges of the chisel head. These chisel sides recede, beginning at the chisel tip, only slightly from the cut surface, i.e. that surface of the rock or ore to be cut, which is formed after the chisel head passed by. Another feature of the chisel head of the present invention consists in that the front edge forms an acute angle with the two side edges.

Experience has shown that a cutting roller equipped with chisel heads according to the invention may have the number of chisels considerably reduced while furnishing a coarser cut and requiring considerably less power.

Advantageously, the side edges of the heads of the cutting chisels are convex, and also the front edges of the chisel heads may be convex. The lateral surfaces of the chisel heads, which are confined by the front edge and each of the two side edges of the chisel head, are arched inwardly in the manner of a plow blade. A similar design may also be provided for the triangular surfaces confined by the two lateral edges which surfaces, as mentioned above, protrude only slightly from the tip of the chisel beyond the cut surface.

The cutting edges of the chisel heads are provided with a highly wear resistant plating. This plating may best be applied by welding. The cutting edges may have a sawtoothed shape.

When the cutting roller moves parallel to the wall of the solid rock or ore, for instance parallel to a coal front, it is desirable that the new coal front formed after the passage of the cutting roller will always be plane again. In order to realize this, according to the present invention, the cutting roller has its annular cutting area located closest to the respective new coal front provided with chisels the heads of which correspond to the half of one tetrahedron forming the basic shape of the chisel head in conformity with the present invention. The arrangement is such that the tetrahedron is assumed to have been cut along the plane of symmetry perpendicular to the drum axis, while the said cutting surface is located toward the drum end. By stating that these chisels working along the cutting line closest to the respective new coal front have to have the shape of such "half tetrahedrons" it is not meant that their dimensions equal those of half chisels mounted on the other annular cutting area. It is merely intended to bring out that the width of the chisels working along the cutting line closest to the respective new coal front should equal those of the remaining chisels. Also the length of the front and lateral cutting edges should remain the same so that there will be a different geometrical configuration for the tetrahedron forming the chisel head.

The chisel heads employed in conformity with the present invention merge with the tetrahedron surface opposite the tip into a chisel shank. This shank is by means of a lateral arm introduced into a hollow chisel holder mounted on the cutting roller or drum and is connected to said holder. In order to keep the required power for driving the roller low, it is important that the axis of the chisel shank will form an acute angle with the surface of the roller, which should be less than 45°. As a result thereof, the axis of the chisel shank will extend approximately in the direction of the resultant formed on one hand by the forcing away force acting upon the cutting edges of the chisels, and on the other hand by the main cutting force exerted upon the chisel head during the rotation of the roller. This will cause the breaking force of the chisels to act in a direction which forms a considerable angle with the surface to be cut which explains the relatively low driving power required for the arrangement according to the present invention. In contrast thereto, with heretofore known chisels provided with inserted plate-like hard metal edge, the breaking force formed only a very small acute angle with the surface to be cut.

Figure 2:
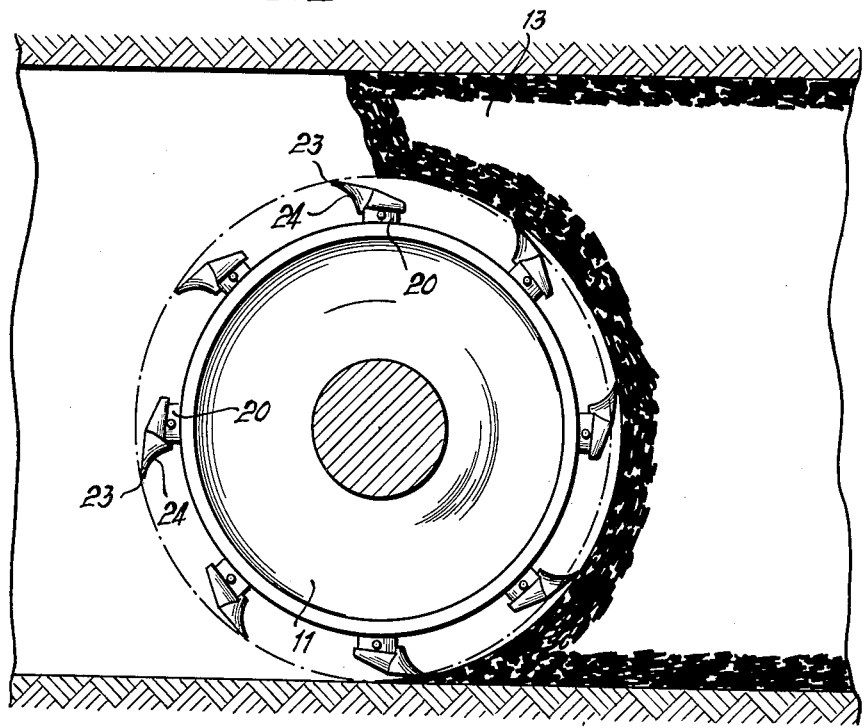
FIG. 2 is a view of the cutting roller (on a scale somewhat larger than that of FIG. 1) when viewing the roller in the direction of the driving shaft therefor.
Figure 3:
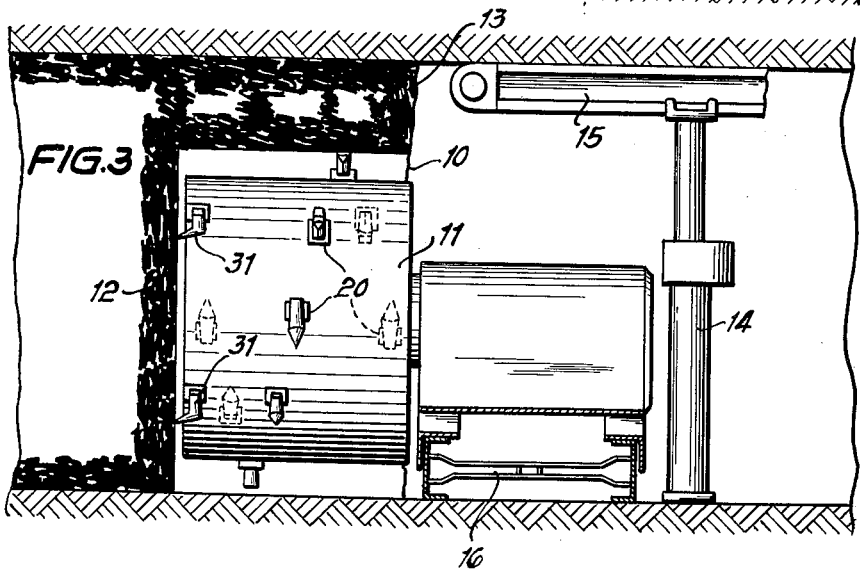
FIG. 3 is a view of the arrangement shown in FIG. 1 at the same scale as in FIG. 1 and seen in the direction of the advance of the roller.

Referring now to the drawings in detail and to FIGS. 1 to 3 thereof in particular, these figures, which illustrate the mining of pit coal in mine shafts, show the old coal front 10 into which the cutting roller 11 cuts in such a way that after passage of said roller 11 the rear cut surface 12 will form the new coal front. The coal layer 13 which remains above the path of the cutting roller 11 will drop by itself if the coal is relatively loose. Otherwise it will be loosened by other means. The reference numeral 14 designates the mine props (one only being shown) whereas the reference numeral 15 designates the prewedged caps (one only being shown). Below the caps there is arranged a frame 17 of the cutting roller 11 with motor and transmission. Said frame 17 is movable on the path of the shaft conveyor 16. The movement of frame 17 through the mine shaft is effected by means of a cable or rope 18 which is pulled from one end of the shaft and passes over three rollers 19 arranged at the head of frame 17.

The effective elements of the cutting roller 11 are represented by the cutting chisels mounted on the drum-like surface of the cutting roller 11. The cutting chisels are arranged in a plurality of planes located perpendicular to the axis of the roller. In each of these planes there is located a circular cutting line along which the chisels will penetrate into the rock to be worked, in this particular instance into the coal.

It will be appreciated that with heretofore known arrangements of the general type set forth above, a plurality of chisels is arranged on each cutting line or on each cutting ring, with the chisels uniformly distributed over the circumference and arranged one after the other, while each individual chisel has only a shallow cutting depth.

In contrast to this arrangement, according to the present invention, the number of chisels is considerably less and for instance, as shown in FIGS. 1 to 3, a single chisel only is mounted on each cutting line. This chisel is clearly shown in FIGS. 1 to 3. Merely along the deepest penetrating cutting line when looking in the axial direction of the cutting roller, a plurality of chisels 31 are provided in order to assure a smooth cut and a particularly plane course of the new coal front 12.

A special design of the chisel according to the present invention will now be explained in connection with FIGS. 4 to 8.

As will be evident from FIG. 4, the hollow chisel holder 20 is connected, for instance by welding, to the surface of the cutting roller 11. The chisel holder 20 holds a chisel which has been inserted into said holder 20 by means of an arm 22 laterally protruding from the chisel shank 21. Arm 22 is provided with a bore 22' for insertion of a pin 22" leading through said chisel holder. The chisel mounted on the front portion of the chisel shank 21 has the shape of a tetrahedron, one corner of the tetrahedron being formed by the chisel tip 23 (FIG. 5). From this tip radiate the three sides of the tetrahedron, namely the front cutting edge 24 and the two lateral edges 25 of the chisel. The said edges 24 and 25 lead to the base of the tetrahedron. The chisel shank 21 is connected to the said base. The front edge 24 forms together with the two lateral edges 25 two jaw surfaces 26 respectively which are arched inwardly so that the front side of the chisel will resemble the shape of a plow blade.

Also the triangular surface 27 (FIG. 7) which is confined by the two lateral edges 25 and which during the cutting operation will, beginning from the tip 23, only slightly be lifted from the cut surface 28, bulges toward the inside. The cutting edges 24 and 25 are provided with a highly wear-resistant plating which has been applied by welding.

FIG. 4 will furnish a picture of the forces which will occur when the chisel enters into the coal and cuts the same from the coal front 29 to the coal front 28.

Approximately perpendicular to the cut surface 28, a force will act upon the chisel which will tend to force the chisel away and which is to be countered by an equally strong reaction force by the chisel. The said reaction force is indicated in FIG. 4 by the arrow $P_1$. The main cutting force of the chisel which extends approximately in the direction of the tangent to the cut surface 28 at the chisel tip, has been designated with the character $P_2$. Thus, as the resultant of the two forces $P_1$ and $P_2$ there is obtained a force R which has to be exerted by the chisel.

It is a further feature of the present invention that the axis of the chisel shank extends substantially in the direction of the resultant R. Inasmuch as the force $P_2$ usually exceeds the force $P_1$, as a rule the resultant R forms with the cut surface 28 an acute angle which is less than 45°, said cut surface 28 extending substantially parallel to the surface of the roller 11. In this way, it is safely to be assumed that the direction of the chisel shank and the direction of the resultant force R will be spaced from each other to any material extent if the angle formed by the axis of the chisel shank 21 with the periphery of the roller is selected less than 45°.

The design of the chisel shank in form of a tetrahedron with the three preferably convex cutting edges, namely front edge 24 and two lateral edges 25, together with the working direction of the chisel in the rock or ore, said working direction being obtained by exerting the cutting force substantially in the direction indicated by the arrow R, leads to two surprising and very important results. One of the results consists in that the wear of the working tool is considerably reduced, while the other result consists in that the cutting roller will require considerably less power for loosening the rock or ore or the like.

Both features just mentioned are of considerable importance for the practical operation of cutting rollers. The cutting chisels may remain in operation without interruption for a plurality of weeks before it will be necessary to exchange them in view of a strong wear. With the heretofore known chisels which have been referred to above and which are provided with inserted hard metal edge, with which the force of attack is effected almost perpendicularly with regard to the chisel shank and subjects the chisel shank to bending stress, it was frequently required to exchange the chisel already after two hours of operation and to insert a new chisel head with fresh hard metal edge. The reduction in the power required for driving the cutting roller is of considerable importance in connection with underground mining. In this connection it should be noted that a reduction in the required power will permit a reduction of the total weight of the machine frame. Above all, however, in installations where the drive can be effected by compressed air only, every decrease in the required power means a considerable saving in compressed air which latter is employed at a rather low degree of efficiency only.

In view of the favorable rate at which the cutting force of the chisel will be effective in conformity with the present invention, also a lighter and wider chip can be obtained so that the number of the chisels effective along the cutting line may be reduced even to one. As a result thereof, the rock, ore, or the like will be forced away from the chisels in larger pieces. This is indicated in FIG. 4 which shows a piece 30 just being separated by the chisel from the remaining rock or the like. When cutting coal, the latter will be obtained in larger pieces whereby the development of dust will be reduced and considerably more coal will be obtained in larger and more valuable pieces.

FIG. 9 illustrates a chisel in which the front cutting edge 24 as well as the two lateral edges 25 are serrated. FIG. 10 illustrates a chisel 31 as it is to be used at the deepest line of penetration of the cutting roller into the coal front when looking in axial direction of the roller toward the coal front. The chisel 31 has in comparison to the equilateral tetrahedron of the other chisels the form of a semi-tetrahedron. This means that the angle formed by the outer lateral surface of the chisel with the base surface is substantially a right angle. The angle between the front edge 24 and the remaining lateral edge 25 is greater than with the other chisels. The chisel shown in FIG. 10 will produce a substantially plane cut for the front surface 12 of the new coal front.

It is, of course, to be understood that the present invention is, by no means, limited to the particular constructions shown in the drawings but also comprises any modifications within the scope of the appended claims.

What we claim is:

1. A rotatable chisel-equipped cutting roller, which comprises: a roller, a plurality of chisels mounted in spaced relationship to each other on the periphery of said roller and respectively having a head of at least approximately the shape of a tetrahedron, each of said approximately tetrahedron-shaped chisel heads having a front cutting edge located in a plane substantially perpendicular to the axis of rotation of said roller and forming the plane of symmetry of the respective chisel head, said front edge being inclined to the periphery of the roller so as to form an acute angle therewith opening in the direction of rotation of the roller, each of said chisel heads having two lateral cutting edges extending substantially parallel to the surface being cut and arranged on opposite sides of and symmetrically located with regard to said plane of symmetry and forming with the said front edge the tip of the respective chisel head, the surfaces confined by said front cutting edge and said two lateral cutting edges of the respective chisel head being concave and forming the outermost surfaces thereof when looking in radial direction of said roller from the axis of rotation thereof.

2. A cutting roller according to claim 1, in which the two lateral cutting edges of each chisel head have a convex contour.

3. A rotatable chisel-equipped cutting roller, which comprises: a roller, a plurality of chisels mounted in spaced relationship to each other on the periphery of said roller and respectively having a head of at least approximately the shape of a tetrahedron, each of said approximately tetrahedron-shaped chisel heads having a front cutting edge located in a plane substantially perpendicular to the axis of rotation of said roller and forming the plane of symmetry of the respective chisel head, said front edge being inclined to the periphery of the roller so as to form an acute angle therewith opening in the direction of rotation of the roller, each of said chisel heads having two lateral surfaces intersecting along said front cutting edge and arched inwardly, said two lateral surfaces respectively including a lateral cutting edge, said two lateral cutting edges of each chisel head being located on opposite sides of and being arranged symmetrically to the plane of symmetry and extending substantially parallel to the surface being cut and forming with said front edge the tip of the respective chisel head, the surfaces confined by said front cutting edge and said two lateral cutting edges of the respective chisel head forming the outermost surfaces thereof when looking in radial direction of said roller from the axis of rotation thereof.

4. A rotatable chisel-equipped cutting roller, which comprises: a roller, a plurality of chisels mounted in spaced relationship to each other on the periphery of said roller and respectively having a head of at least approximately the shape of a tetrahedron, each of said approximately tetrahedron-shaped chisel heads having a front cutting edge located in a plane substantially perpendicular to the axis of rotation of said roller and forming the plane of symmetry of the respective chisel head, said front edge being inclined to the periphery of the roller so as to form an acute angle therewith opening in the direction of rotation of the roller, each of said chisel heads having two lateral cutting edges arranged on opposite sides of and symmetrically located with regard to said plane of symmetry and extending substantially parallel to the surface being cut and said lateral cutting edges diverging rearwardly from the tip of the respective chisel head, the surface confined by the two lateral cutting edges of the respective chisel head being slightly arched inwardly in the direction toward the axis of rotation of said roller.

5. A rotatable chisel-equipped cutting roller, which comprises in combination: a drum, holding means connected to the outer peripheral surface of said drum along axially spaced circumferential portions thereof, a plurality of chisels respectively comprising a shank, a projection on each shank, mounted in said holding means, each chisel also comprising a chisel head connected to said shank and having at least approximately the shape of a tetrahedron, one corner of said tetrahedron forming the cutting tip of the respective chisel head and that surface of the tetrahedron which is located opposite said cutting tip merging with said shank, each of said approximately tetrahedron-shaped chisel heads having a front cutting edge extending from the cutting tip and located in a plane substantially perpendicular to the axis of rotation of said roller and forming the plane of symmetry of the respective chisel head, said front edge being inclined to the periphery of the roller so as to form an acute angle therewith opening in the direction of rotation of the roller, each of said chisel heads having two lateral cutting edges arranged on opposite sides of and symmetrically located with regard to said plane of symmetry, said lateral edges being substantially parallel to the surface being cut while diverging rearwardly from the respective adjacent front edge and forming therewith the tip of the respective chisel head, the surfaces confined by said front cutting edge and said two lateral cutting edges of the respective chisel head forming the outermost surfaces thereof when looking in radial direction of said roller from the axis of rotation thereof.

6. A cutting roller according to claim 5, in which the axis of each of said chisel shanks forms with the adjacent circumferential portion of the roller an angle of less than 45°.

7. A chisel for use in connection with cutting rollers for cutting coal and ores, which has a shank and a head connected thereto, said head having at least approximately the shape of a tetrahedron with one corner of said tetrahedron forming the cutting tip of said chisel and with one edge of said tetrahedron extending from said cutting tip in a plane substantially bisecting the tetrahedron surface located opposite to the cutting tip and forming the plane of symmetry of said chisel head, the two lateral edges of said tetrahedron which intersect at said tip with the front cutting edge being convex and extending substantially parallel to the surface being cut, the two surfaces of said tetrahedron which include said two lateral edges and said tip intersect to thereby form the front cutting edge of said chisel, said front cutting edge and said two lateral edges confining lateral surfaces of said tetrahedron which are arched toward each other.

References Cited in the file of this patent

UNITED STATES PATENTS

| | | |
|---|---|---|
| 1,472,641 | Etrich et al. | Oct. 30, 1923 |
| 1,612,066 | Shanaberger | Dec. 28, 1926 |
| 1,679,049 | Nelson | July 31, 1928 |
| 2,033,594 | Stoody | Mar. 10, 1932 |
| 2,549,088 | Hettelsater | Apr. 17, 1951 |
| 2,786,663 | Morrow | Mar. 26, 1957 |

FOREIGN PATENTS

| | | |
|---|---|---|
| 620,447 | Germany | Oct. 21, 1935 |
| 767,324 | Great Britain | Jan. 30, 1957 |
| 772,377 | Great Britain | Apr. 10, 1957 |